United States Patent [19]
Lazar

[11] Patent Number: 5,852,676
[45] Date of Patent: Dec. 22, 1998

[54] METHOD AND APPARATUS FOR LOCATING AND IDENTIFYING FIELDS WITHIN A DOCUMENT

[75] Inventor: Theodore G. Lazar, San Carlos, Calif.

[73] Assignee: Teraform Inc., San Jose, Calif.

[21] Appl. No.: 419,663

[22] Filed: Apr. 11, 1995

[51] Int. Cl.⁶ .............................. G06K 9/00; G06K 9/34
[52] U.S. Cl. ..................... 382/173; 382/174; 382/175; 382/176; 382/180; 382/138
[58] Field of Search ................................. 382/175, 176, 382/138, 173, 174, 180

[56] References Cited

U.S. PATENT DOCUMENTS

| | | | |
|---|---|---|---|
| 3,818,445 | 6/1974 | Neville | 240/146.3 |
| 4,685,141 | 8/1987 | Hoque et al. | 382/7 |
| 4,949,392 | 8/1990 | Barski et al. | 382/61 |
| 4,965,763 | 10/1990 | Zamora | 364/419.19 |
| 5,040,226 | 8/1991 | Elischer et al. | 382/7 |
| 5,091,964 | 2/1992 | Shimomura | 382/176 |
| 5,097,517 | 3/1992 | Holt | 382/7 |
| 5,119,433 | 6/1992 | Will | 382/7 |
| 5,181,255 | 1/1993 | Bloomberg | 382/9 |
| 5,185,813 | 2/1993 | Tsumjimoto | 382/9 |
| 5,258,855 | 11/1993 | Lech et al. | 358/462 |
| 5,321,770 | 6/1994 | Huttenlocher et al. | 382/22 |
| 5,359,667 | 10/1994 | Borowski et al. | 382/138 |
| 5,369,508 | 11/1994 | Lech et al. | 358/462 |

OTHER PUBLICATIONS

Casey, et al. "Intelligent Froms Processing", 29 IBM Systems Journal 435–50, (1990).

Voit "Fuzzy Logic in C, Dr. Dobb's Journal", Feb. 1993, pp. 40–49, 1994.

GTESS Corp., press release Apr. 6, 1993.

GTESS Corp., flyer "Automated Data Entry System" (Apr. 11, 1994).

Microsystems Technology, Inc., flyer "OCR For Forms" (undated).

Symbus, flyer "Automated Data Entry for Forms Processing" (undated).

Top Image systems, flyer "AfterScan Document Enhancer" (undated).

VisionShape, Inc. flyer "AutoClass Indexing and Forms OCR Products" (1992).

Wheb Systems, Inc., press release "Wheb Systems Annotates I.F.P.S. 3.0 Availability" (Apr. 18, 1994).

Wheb Systems, Inc. "Corporate Backgrounder" (Spring 1994).

Wong, et al. "Document Analysis System", IBM J Res. Develop. vol. 26, No. 6, Nov. 1982.

*Primary Examiner*—Leo H. Boudreau
*Assistant Examiner*—Daniel G. Mariam
*Attorney, Agent, or Firm*—Townsend and Townsend and Crew LLP

[57] ABSTRACT

A document to be processed is scanned into a machine readable image. The image is segmented into a plurality of fields. Predetermined characteristics are measured for each field and the set of characteristics is correlated with a predetermined set of characteristics derived from a reference image. The fields with the highest degree of correlation to the characteristics from the reference document are selected for further processing, e.g., optical character recognition.

13 Claims, 12 Drawing Sheets

101 ⬉

| Invoice | Date | Invoice |
|---|---|---|
| TeraForm, Inc.<br>2 North First Street<br>Suite 501<br>San Jose, CA 95113 | 01-15-95 | 002821 |

| | PO Number | Terms | Project |
|---|---|---|---|
| | 11351 | Net 30 | Alpha |

| Quantity | Description | Rate | Amount |
|---|---|---|---|
| 2 | CD1617P/60 Display Monitor | $1,200 | $2,400 |
| | Tax 8% | | $192 |
| | | Total: | $2,592 |

Invoice

TeraForm, Inc.
2 North 1st St.#501
San Jose, CA 95113

| Date | Invoice Number |
|---|---|
| 01-15-95 | 002632 |

| PO# | Terms | Project |
|---|---|---|
| 22199 | Net 60 | Beta |

| Qty. | Description | Unit Price | Amount |
|---|---|---|---|
| 1 | TERA/EV60 Scanning Station<br>Tax 8% | $2,200 | $2,200<br>$176 |
| | | Total: | $2,376 |

*FIG. 3.*

Invoice

TeraForm, Inc.
2 North First Street
Suite 501
San Jose, CA 95113

Invoice 002821   Date 01-15-95   PO Number 11351

Project Alpha   Terms Net 30

Amount $2,400   Rate $1,200

Quantity 2   Description CD1617P/60 Display Monitor

Tax 8%   $192

Total: $2,592

*FIG. 7A.*

METHOD AND APPARATUS FOR LOCATING AND IDENTIFYING FIELDS WITHIN A DOCUMENT

TECHNICAL FIELD

This invention relates to a system, method and apparatus for processing a scanned image of a printed document in order to select one or more fields for further processing.

BACKGROUND

It is common to use computers for the storage of data acquired in a business environment. Frequently, this data will be presented to a business only in a printed form. Although the printed form is readable to human beings, it cannot be directly processed by the computer.

A traditional approach to entering this data in the computer is through a human data entry operator. Under this method, a data entry operator views the document that contains the data to be entered into the system. The data entry operator manually locates the desired data on the form, reads that data and enters the data into the computer by means of a keyboard. The disadvantages to this approach is the cost of employing the individual performing the data entry function and the likelihood of errors. Errors may be introduced, for example, by the operator incorrectly reading a portion of the data or making a typographical error by pressing incorrect keys while entering the data.

This problem has partially been solved through the use of Optical Character Recognition (OCR). A shortcoming of OCR, however, is that while OCR may be applied to recognize individual characters, OCR is unable to distinguish between fields on the document that are desired to be entered and fields that are not desired. In addition, OCR cannot determine which fields correspond to which desired data. Therefore, it is desirable to have a system that is capable of processing a document, locating the fields in the document, distinguishing between unwanted data and desired data, and selecting the desired data for processing by OCR or other means.

One method of locating such fields is to manually determine the locations of the fields once using a typical document as a model. The location of the desired data may then be specified in terms of X and Y pixel coordinates. When a second document is presented for processing, the data at the previously specified X and Y coordinates can be selected for processing. Such a method, however, is not tolerant of variations between the reference document and the document to be processed. Even minor variations in the placement of the same data on the processed will result in the selection of incorrect portions of the processed document. It is therefore desirable to have a system for locating fields in documents that is tolerant of variations among the formats of the documents being processed.

U.S. Pat. No. 5,119,433 discloses a method and system for locating the amount field on a document. The system disclosed in that patent locates an amount field on a check and distinguishes it from other fields, such as a date field, that may have similar characteristics. One shortcoming of the system disclosed in the U.S. Pat. No. 5,119,433 patent is that it is limited to processing checks. A further shortcoming is that it is limited to determining a single field, the amount field, on that check. The U.S. Pat. No. 5,119,433 patent teaching relies on a particular configuration of lines found on check. Its method cannot be generalized to work for other types of documents that do not conform to the particular layout that is present in a check. In addition, that method cannot be used to identify fields other than by line placement.

U.S. Pat. No. 5,181,255 discloses a method and apparatus for the segmentation of handwriting and machine printed text. The method disclosed in the U.S. Pat. No. 5,181,255 patent differentiates and extracts handwritten annotations and machine printed text in an image. Thus, it is capable of determining what portions of a printed document were printed by a machine and what portions were written in hand. But, the method taught by the U.S. Pat. No. 5,181,255 patent is incapable of recognizing the context of either the handwritten or machine printed text, and is unable to determine the type of data on the form.

Accordingly, it is desirable to provide a method and apparatus that is capable of taking as input a scanned image of a document, determining the locations of the various fields on a document, differentiating between desired fields and unwanted fields on the document, associating each desired field with a particular type of input, and selecting each of those fields for OCR or a similar process.

SUMMARY OF THE INVENTION

Briefly, the invention provides for the selective extraction of data from a printed document. To establish a reference, a machine-readable image of a reference document is partitioned into a number of reference fields. An operator selects from the reference fields the fields that represent data that is desired to be extracted from other documents to be processed later. For each selected reference field, the operator specifies a number of characteristics of the field, such as an X-coordinate and Y-coordinate indicating the field's position, a number of characters in the fields, and the like. For each such characteristic, the operator specifies a number (generally two) of values that indicate threshold values. These values will be used as a basis of later comparisons with fields in a later processed subject document to determine whether the fields of the subject document match those of the reference document.

Once the reference is established, a machine-readable image of a subject document can be processed. The image is partitioned into a number of subject fields. Each such subject field has a variety of characteristics corresponding to the characteristics that were specified for the reference fields. The values for each of the characteristics for each field are measured and stored. The characteristic values are compared to the set of values that describe the characteristics of the reference fields on the reference document. A correlation value is determined, which indicates how well the measured characteristic corresponds to the characteristics of the reference field on the reference document. The correlation values are combined to yield a composite correlation value, which indicates how well the field corresponds to the reference field of the reference document. The composite correlation value is compared to a target value, and the field with the composite correlation value nearest the target value is selected for further processing such as optical character recognition.

BRIEF DESCRIPTION OF THE DRAWINGS

The present invention may be better understood, and its numerous objects, features and advantages made apparent to those skilled in the art, by referencing the accompanying drawings in which:

FIG. 2 depicts a sample reference document.

FIG. 3 depicts a sample subject document.

FIG. 7A depicts an operator combining multiple image element groups into a single field.

DESCRIPTION OF SPECIFIC EMBODIMENTS

Overview

Figure 1:
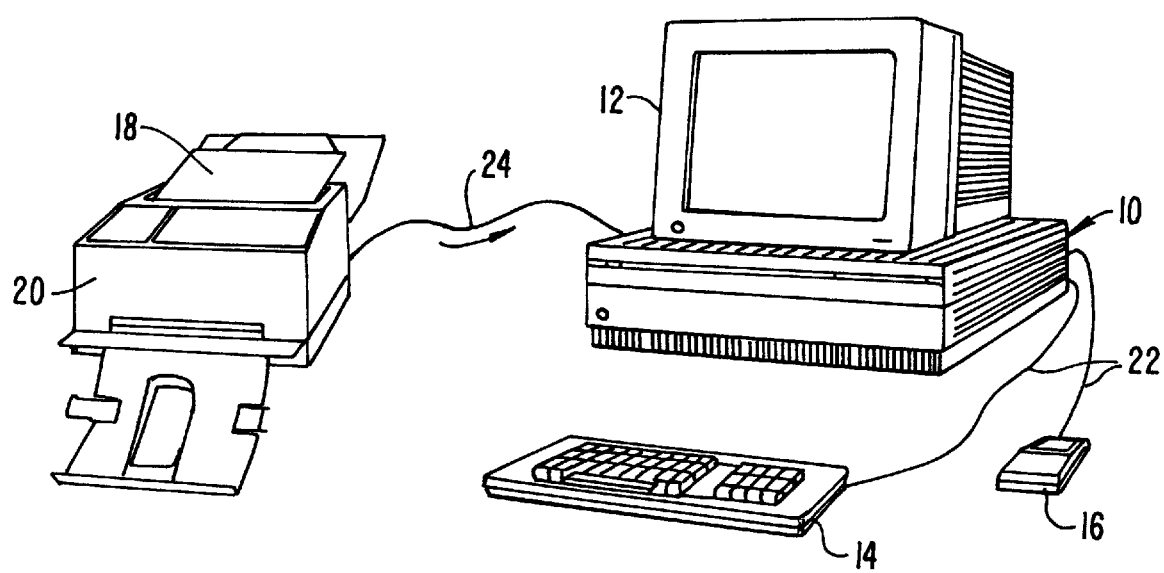
FIG. 1 depicts an apparatus configured to practice the invention.

The invention facilitates the extraction of desired data fields from a document. FIG. 1 depicts an apparatus for the extraction of desired data fields from a document 18. The apparatus comprises a computer 10 with an attached monitor 12. The computer performs the steps of the method disclosed herein. The apparatus includes one or more means of providing operator input to the computer, such as a keyboard 14 and a pointing device such as a mouse 16, connected to the computer with cables 22. Preferably, the apparatus includes a document imaging means such as a scanner 20 that is capable of scanning a printed document 18 and converting it to a machine-readable binary image. Typically, the document imaging means 20 communicates with the computer 10 using a scanner cable 24 as indicated by the directional arrow.

Figure 1A:
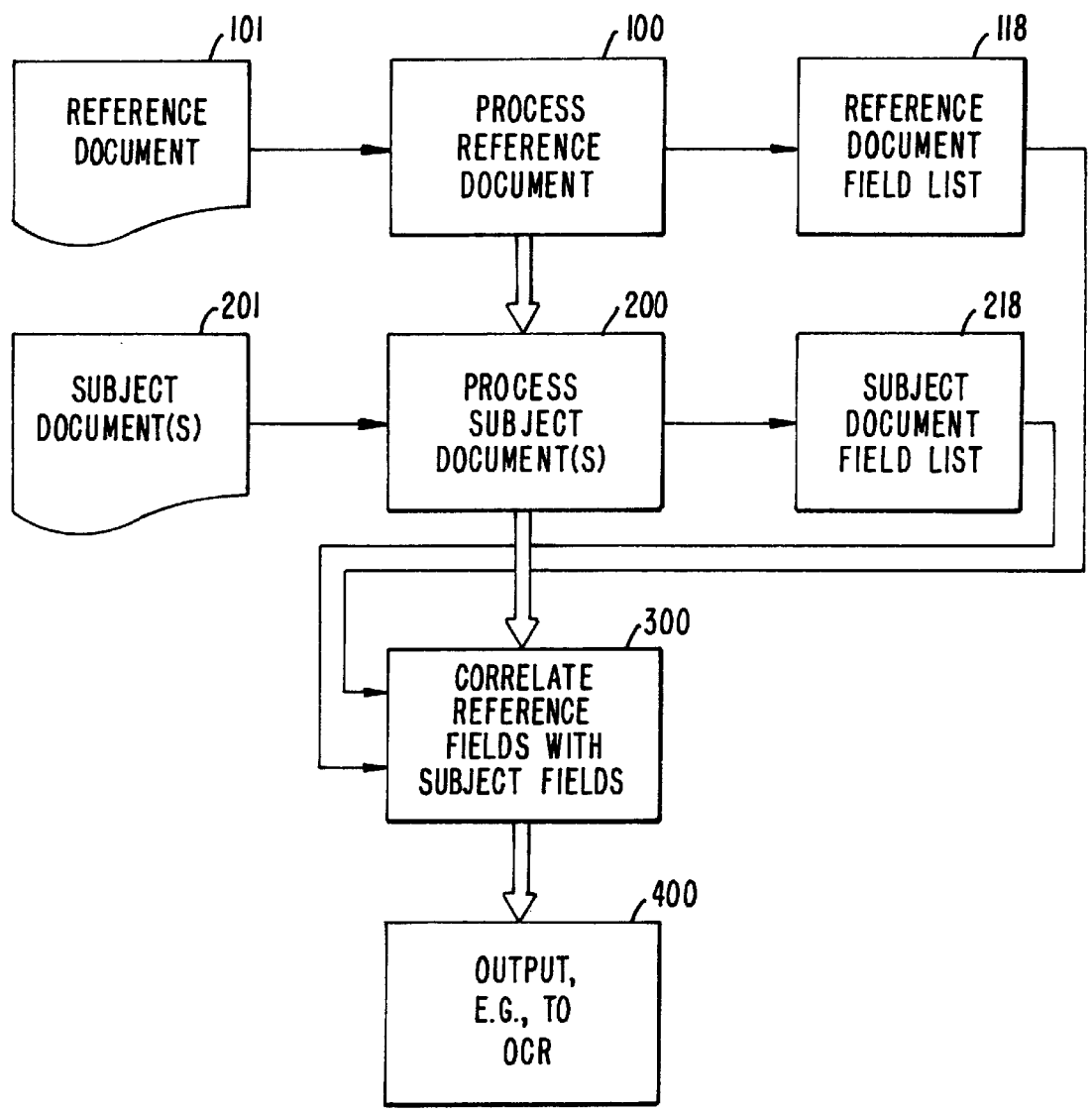
FIG. 1A is a block diagram depicting an overview of the process of the invention.

FIG. 1A depicts the major steps of the method of operation of the apparatus. These major steps are major step 100, processing of the reference document; major step 200, processing of a subject document; major step 300, correlating reference fields with subject fields; and major step 400, output of identified data from selected subject fields.

In major step 100, a reference document 101 is input by the operator of the apparatus, generally by scanning the reference document 101 with the scanner 20. The reference document is a document that depicts a typical layout of the document or documents ("subject documents") from which the operator desires to extract particular fields to be processed. The reference document has data whose fields are recognizable by the operator of the apparatus. An example of a reference document is depicted in FIG. 2. The reference document is taken as input by major step 100, which processes the reference document and produces a reference document field list 118. The reference document field list identifies every field on the reference document that is anticipated to have a counterpart on documents to be later processed. Each reference document field list entry includes information regarding the location and characteristics of the corresponding reference document field.

In major step 200, a subject document 201 is input by the operator of the apparatus, generally by means of scanning the subject document 201 with the scanner 20. The subject document is a document on which the operator desires to locate and identify fields to be processed. A subject document has a layout that is similar to, but need not be identical to, the reference document. An example of a subject document is depicted in FIG. 3. The subject document is taken as input by major step 200, which processes the subject document and produces a subject document field list 218. The subject document field list identifies every area on the subject document that represents a group of textual or other data, and that might correspond to a reference field. Each subject document field list entry includes information regarding the location and characteristics of the corresponding subject document field.

The reference document field list 118 and the subject document field list 218 are taken as input by major step 300. For each reference document field, major step 300 compares that field's characteristics with the characteristics of every subject document field for the subject document. The subject document field with the highest degree of correlation of the reference document field is identified as corresponding to the first reference document field. The process is repeated for each reference document field until a subject document field has been identified as corresponding to each reference document field.

In major step 400, the identified subject document fields are provided as output, for example, to an OCR process or other process.

Major Step 100: Processing of the Reference Document

Figure 4:
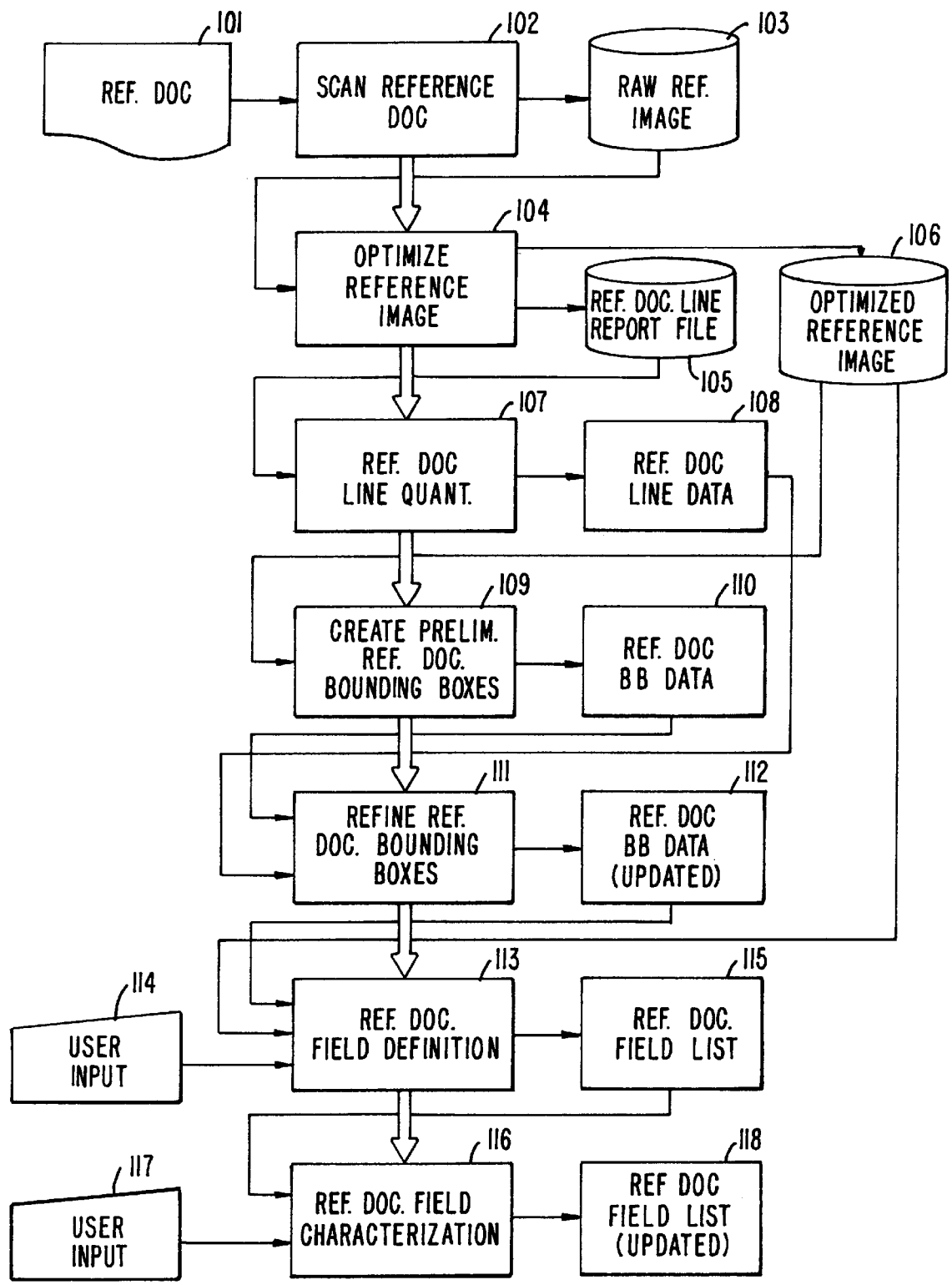
FIG. 4 is a block diagram depicting the processing of a reference document.

FIG. 4 provides a detailed depiction of major step 100. In a typical embodiment, step 102 takes as input a printed reference document 101 and converts it to a raw reference image 103. The raw reference image 103 generally consists of a bitmap file that represents an electronic pixel image. The raw reference image can be created in any conventional manner, such as the use of an optical scanner, a facsimile machine, an electronic copier, a microfilm reader, a microfiche reader or the like. Alternatively, a raw reference image may be created directly in machine-readable form, thereby bypassing step 102.

After the raw reference image 103 is created, it its provided as input to step 104. For optimal results, step 104 preferably optimizes the raw reference image 103 yielding an optimized reference image 106. Optimization refers collectively to the processes of cleaning up, deskewing, registration and line removal. These processes are known in the prior art and may be performed using commercially available image processing products, such as FormFix, a product from Sequoia Data, Burlingame, Calif. Cleaning up comprises examining the raw reference image for imperfections such as specks or other imperfections introduced by the scanning process and erasing them. The deskewing process corrects for imperfections in the angle at which the reference document was scanned. In the deskewing process, the image data is rotated so that the image is presented at right angles relative to the borders of the image frame, so that text data in the image is substantially parallel to the horizontal border. The registration process adjusts the image horizontally and/ or vertically within the image frame so a substantially equal amount of horizontal border is present on the top and bottom edges of the image and so that a substantially equal amount of vertical border is present on the left and right edges of the image. The line removal process consists of detecting portions of the image data that correspond to vertical or horizontal lines on the raw image. The black pixels that represent the line are replaced with white pixels.

The optimization step 104 produces as output a reference document line report file 105. The reference document line report file includes information that describes each line removed from the reference image. This information includes the line's thickness (in pixels), its starting point (specified as X and Y coordinates) and orientation (horizontal or vertical). A reference document line quantification step 107 takes as input the reference document line report file and encodes the lines reported into a set of reference document line data 108. One way of encoding such line data is in a linked list having nodes according to the following C++LineStruct structure:

```
struct LineStruct {
    // Holds all data pertaining to lines
    short down;
    short over;
    short length;
    short thick;
    struct LineStruct *next;
    struct LineStruct *prev;
};
```

In this structure, the data areas "down" and "over" represent, respectively, the Y-coordinate and X-coordinate of the line origin point; the data areas "length" and "thick" represent, respectively, the length and thickness of the line, in pixels. The data areas "*next" and "*prev" are pointers to the next and previous nodes in the list. A pointer is set to NULL if it does not point to another node (i.e., the "*prev" pointer in the first node of the list, and the "*next" pointer in the last node of the list).

Figure 6:
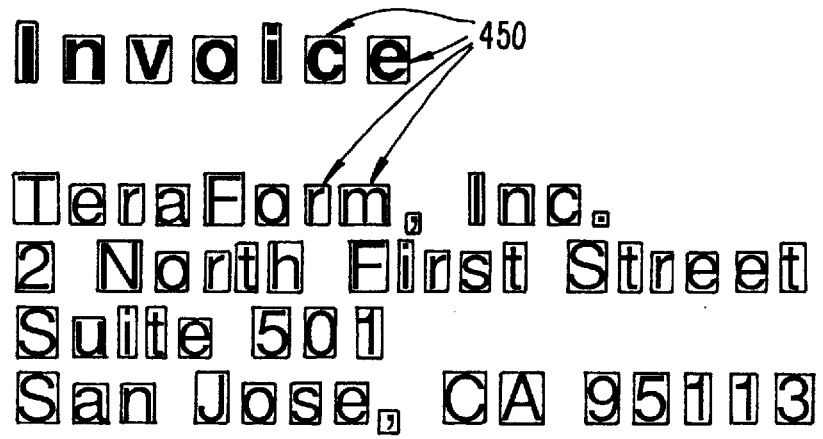
FIG. 6 depicts a fragment of a document image segmented into raw image elements.

In step 109, the reference image 106 is processed to segment the image into a plurality of regions. Typically, this step may be performed using a prior art means, such as the abovedescribed FormFix. Typically, the step comprises detecting groups of contiguous black pixels in the reference image 106 and determining the dimensions of the smallest possible rectangular space that encloses the group. The rectangle that describes by these dimensions is referred to as a "bounding box." The area enclosed by the bounding box is referred to as a "raw image element." An example of a fragment of a reference document image segmented into a number of raw image elements by a number of bounding boxes 450 is depicted in FIG. 6. Step 109 has the effect of creating a bounding box for each alphanumeric or other character that appears in the reference image 106. In addition, step 109 will produce a bounding box for non-character data, including graphics and other symbols, handwritten annotations, and the like. Step 109 produces as output a set of reference document bounding box data 110.

Figure 7:
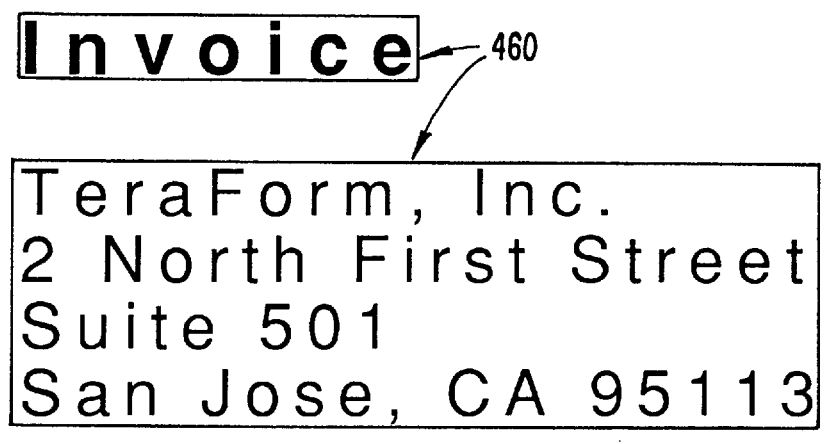
FIG. 7 depicts a fragment of a document image segmented into image element groups.

Step 111 combines certain raw image elements into image element groups defined by larger bounding boxes 460 as depicted in FIG. 7. Neighboring bounding boxes are combined if they are separated by less than a predetermined number of pixels (e.g., 60 pixels). A combined bounding box describes the dimensions of the smallest possible rectangular space that encloses all of the bounding boxes from which it was formed. Step 111 produces as output an updated set of reference document bounding box data 112.

Step 113 produces a set of fields in the reference document for which a corresponding field is to be searched on a later processed subject document. Step 113 takes as input the optimized reference image 103 and the updated set of reference document bounding box data 112. Step 113 presents the optimized reference image 106 to the operator of the system. This presentation includes a suggested separation of the image into fields as defined by the updated reference bounding box data 112. The operator then selects from the fields presented the fields he or she desires to be correlated with fields from subject documents. The resulting fields are referred to as "reference document fields" or "target fields."

In addition, in step 113, the operator may select multiple areas defined by the bounding box data, e.g., with a mouse or other pointing device 16. The operator may thereby override the suggested field boundaries and indicate image element groups that he or she desires to combine into a single reference document field. FIG. 7A depicts the screen of monitor 12 showing the operator combining image element groups 462 and 463 into a single image reference document field. The operator has drawn a box 464 around image element groups 462 and 463 using mouse pointer 466, thereby indicating that the two image element groups are to be combined to form a single reference document field. This interactive approach provides an efficient means of specifying the reference document fields. However, it will be apparent that other means of combining the image elements groups into fields are also available. For example, each image element group could be identified with an identifier made up of letters and/or numbers, and the operator could key in a list of the identifiers of the image element groups to be combined into a particular reference document field. Step 113 encodes the operator's selections into a reference document field list 115. One way of encoding such data is in a linked list having nodes according to the following C++TargetStruct structure, which incorporates the TRefStruct substructure:

```
struct TRefStruct {
    // Holds one reference characteristic for a target
    short value;
    short weight;
    short fz_near;
    short fz_far;
};
struct TargetStruct {
    // Holds all characteristics of known target fields
    short type;
    struct TRefStruct ref[MAXREF];
    struct TargetStruct *next;
    struct TargetStruct *prev;
};
```

In this structure, the data area "type" describes the type of field (either alphabetic, numeric or either). The data area "ref[MAXREF]" defines an array of reference characteristic fields, defined according to the TRefStruct substructure. The fields in the array are initialized in step 116, and their description is deferred until the description of that step. The data areas "*next" and "*prev" are pointers to the next and previous nodes in the list. A pointer is set to NULL if it does not point to another node (i.e., the "*prev" pointer in the first node of the list, and the "*next" pointer in the last node of the list).

Step 116 takes as input the reference document field list 115 produced by step 113. For each reference document field, a predetermined set of characteristics of the field provided by the operator. A characteristic may be any characteristic that is objectively quantifiable, that is helpful to identify the field and that can be correlated to the fields of documents to be later processed. Some examples include:

the X coordinate of the leftmost point of the field;
the Y coordinate of the uppermost pixel of the field;
the width of the field, expressed in pixels;
the height of the field, expressed in pixels;
the number of pixels in the field;
the number of characters in the field;

the number of horizontal lines above the field;
the number of horizontal lines below the field;
the number of vertical lines to the left of the field;
the number of vertical lines to the right of the field; and
the distance in pixels from another field having a particular string of characters (e.g., "date").

Depending upon the nature of the reference image document, other characteristics may be chosen to be stored. The listed characteristics are typical of characteristics that are useful in determining the context of a field. However, it will easily be seen by those skilled in the art that other characteristics may also be applicable and useful for certain applications.

For each characteristic identified, the operator provides as input 117 information regarding the degrees of match between this characteristic and a similarly measured characteristic on a subject document. To specify this degree of matching, the operator specifies at least one value that serves as a criterion for assessing the degree of match for this particular characteristic. The value or values specified is expressed as the amount of deviation from an "ideal" value that a processed field can have and still be considered to match the reference field with respect to this particular characteristic.

Although any number of values can be used, experimentation shows that an embodiment using only two values produces high quality results without excessive processing demands. In this embodiment, the operator specifies exactly two values, referred to as "near" and "far." The value specified for "near" indicates a value at which a compared field is considered by the operator to be likely to be a match. The value specified for "far" indicates a value at which a compared field is considered by the operator to be likely not to match. For example, suppose that the operator is specifying the X-coordinate fields for an address field of the reference document. The operator wishes to indicate that, in a later-processed document, a field with a leftmost X-coordinate of 250 is likely to be an address field, while a field with a leftmost X-coordinate of 400 is not likely to be an address field. The operator will specify for the a value of 250 for "near" and a value of 400 for "far." These values are stored in the data areas "fz_near" and "fz_far," defined in the IRefStruct data structure. Optionally, the operator may specify a weighting factor to be assigned the characteristic. This may be desired if, for example, a characteristic such as X-coordinate is considered to be more useful to identify a field in the subject document than, for example, the number of adjacent vertical lines. The weighting factor is stored in the data area "weight," defined in the TRefStruct data structure. The data area "value" contains the actual measured value of the characteristic for the reference field.

A set of characteristic values and weighting factor is specified for each predetermined characteristic, for each reference document field. Preferably, the resulting updated reference document field list 118 is permanently stored on disk or other recording means.

Major Step 200: Processing of a Subject Document

Figure 5:
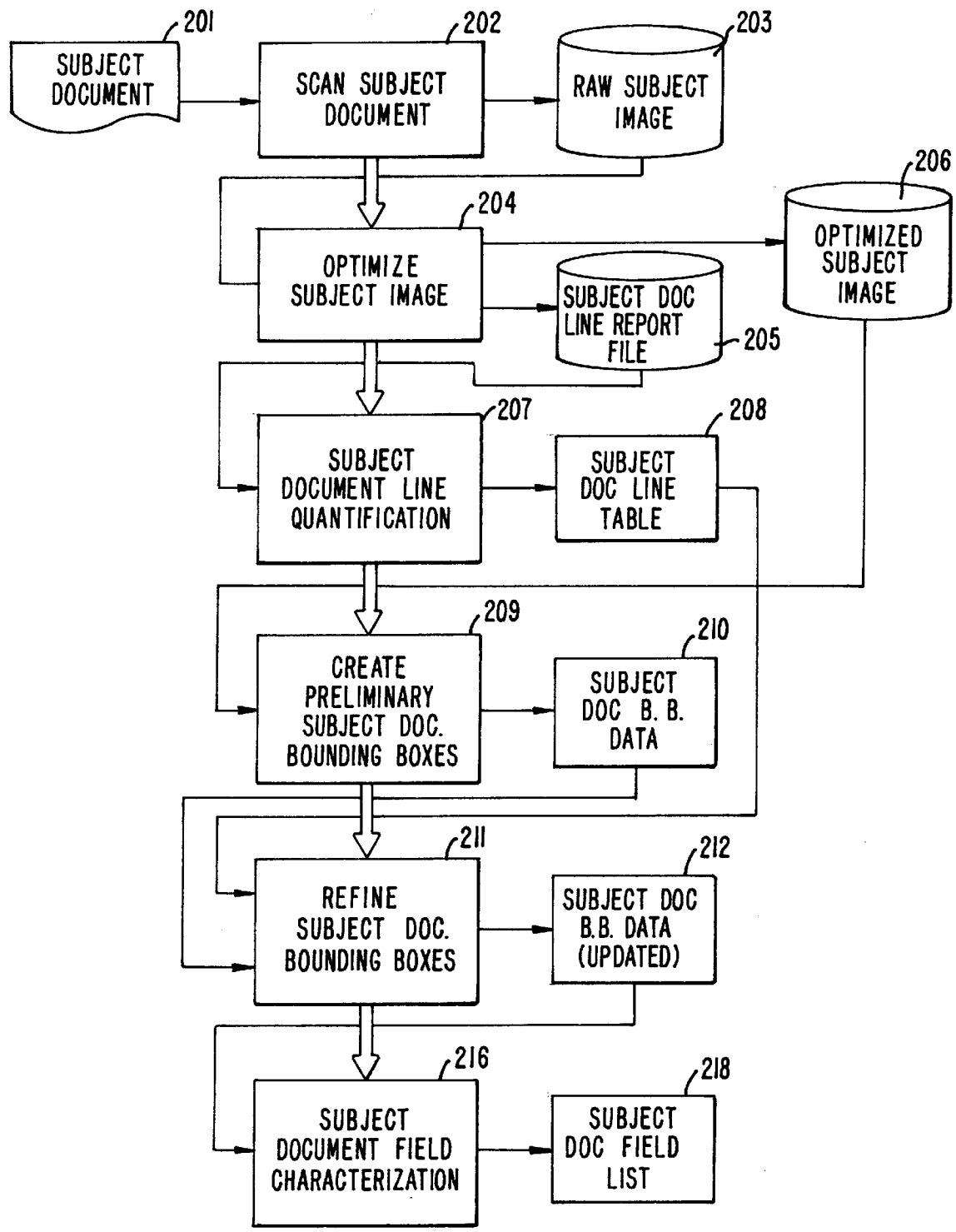
FIG. 5 is a block diagram depicting the processing of a subject document.

FIG. 5 provides a detailed depiction of major step 200. Most of the steps in major step 200 correspond to equivalent steps in major step 100, except that in major step 200, the steps are performed for a subject document rather than for a reference document.

Step 202 takes as input a printed subject document 201 and converts it to a raw subject image 203. The raw subject image 203 is provided as input to an image optimization step 204, which produces a subject document line report file 205 and an optimized subject image 206. The subject document line report file 205 is taken as input by the subject document line quantification step 207, which produces a subject document line table 208. Step 209 takes as input the optimized subject image 208 and produces bounding boxes for each set of contiguous black pixels in the subject document image; these bounding boxes are represented as the subject document bounding box data 210. The subject document bounding box data 210 and the subject document line table 208 are taken as input by step 211, which combines neighboring bounding boxes to produce an updated subject document bounding box table 212.

Each of the bounding boxes in the updated bounding box table 212 represents a field on the subject document, called a subject document field. Some of these fields may contain data that corresponds to a reference document field. Others may contain unwanted data. Step 216 takes as input the subject document bounding box data 212 and assesses the characteristics of each subject document field to produce a subject document field list 218. One way of encoding such data is in a linked list having nodes according to the following C++FieldStruct structure, which incorporates the FRefStruct substructure:

```
struct FRefStruct {
    // Holds one reference characteristic for a field
    short value;
    int score;
};
struct FieldStruct {
    // Holds all data pertaining to regular fields
    short type;
    short conf;
    int score;
    struct FRefStruct ref[MAXREF];
    struct FieldStruct *next;
    struct FieldStruct *prev;
};
```

In this structure, the data area "type" describes the type of field (either alphabetic, numeric or either). The data area "ref[AXREF]" defines an array of subject characteristic fields, defined according to the FRefStruct substructure. Each entry in this array includes a "value" data area and a "score" data area. The "value" data area represents a measurement for one of the same set of predetermined characteristics that was specified in step 116 for the reference document fields. For each such characteristic in each subject document field, the characteristic is measured and its value stored. For example, the X-coordinate of the leftmost pixel in the bounding box for the field is stored in the "value" data area for the array entry corresponding to that characteristic. "*next" and "*prev" are pointers to the next and previous nodes in the list. A pointer is set to NULL if it does not point to another node (i.e., the "*prev" pointer in the first node of the list, and the "*next" pointer in the last node of the list).

The "score" data area in the FRefStruct substructure and the "conf" and "score" data areas in the FieldStruct structure are used in major step 300 in conjunction with the calculation of a composite field correlation value and are described below.

Major Step 300: Correlating Reference Fields With Subject Fields

Figure 8:
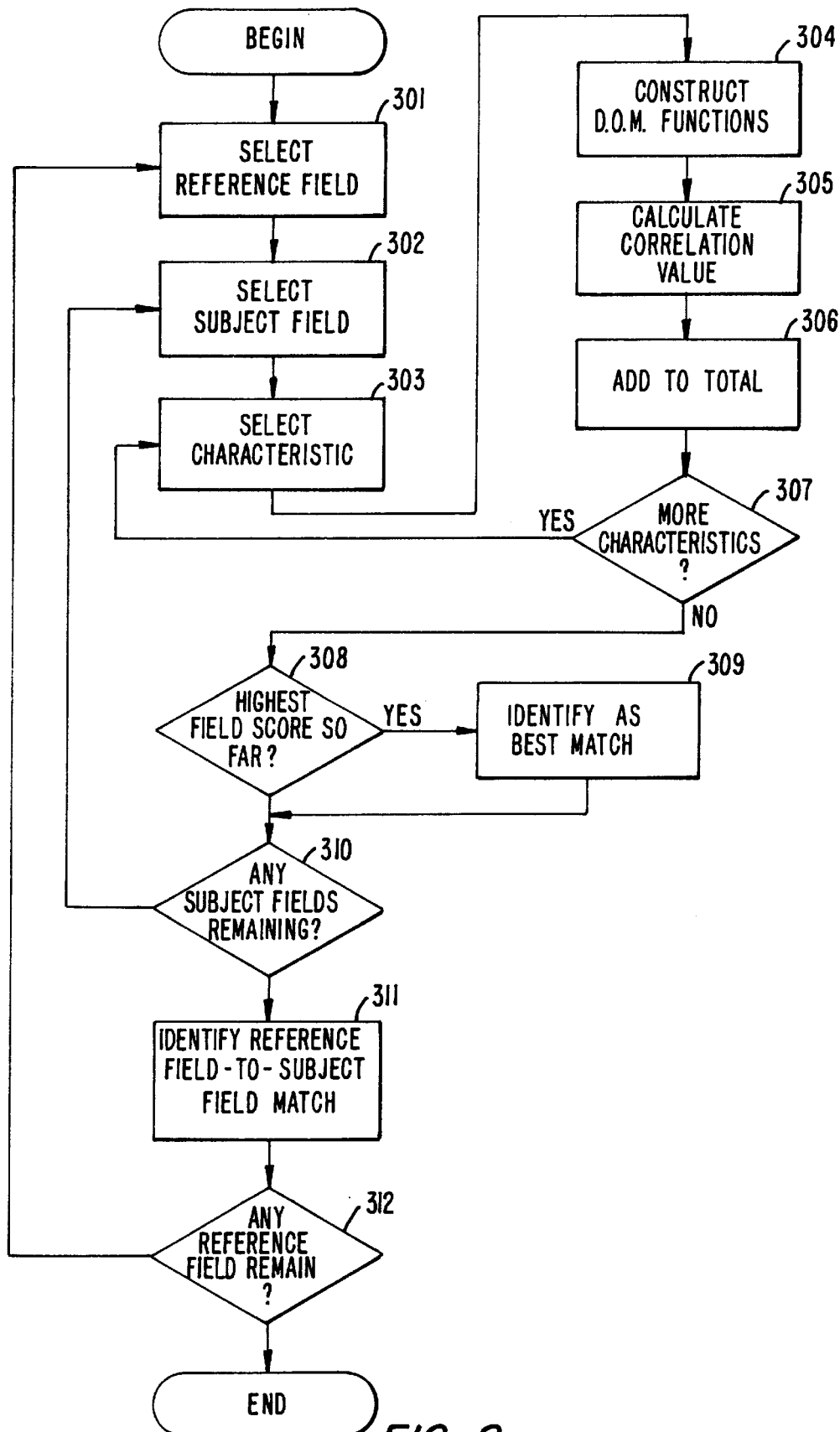
FIG. 8 is a block diagram depicting the method of correlating reference image fields and subject image fields.

FIG. 8 depicts major step 300, which performs the correlation of reference document fields with subject document fields. In step 301, a reference document field, generally the first on the reference document field list 118, is selected for processing. In step 302, a subject document field, generally the first on the subject document field list 218, is selected for comparison to the reference document field. The "score" data area in the FieldStruct structure for the field selected is zeroed.

In step 304, a set of "Degree Of Membership" ("DOM") functions are constructed based upon the values ("near" and "far" in the two-point embodiment) that were specified by the operator for the particular characteristic being processed for the reference field. The apparatus constructs the set of DOM functions by taking the point value or values specified by the operator, and generates two additional points. One generated point serves as an arbitrary reference point, and is generally assigned a value of zero. The other generated point has a value that is higher than the highest operator-specified point by the same amount than the operator-specified point is from its immediately lower point.

Figure 9:
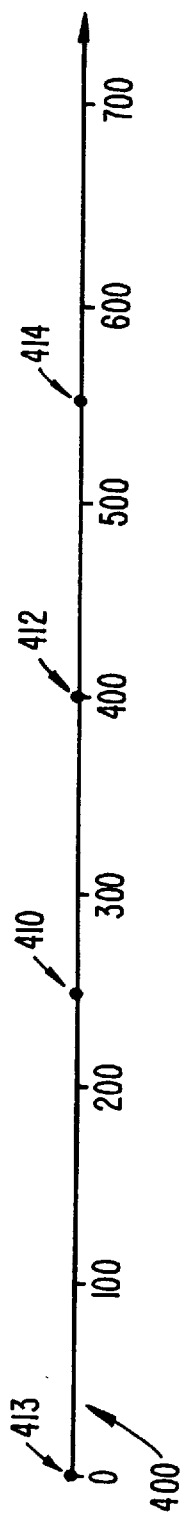
FIG. 9 depicts a number line showing reference points to be used in constructing a set of degree of membership functions.

FIG. 9 provides an example. In this example, the operator specifies two points: "near" having a value of 250 and "far" having a value of 400. This might be used to indicate, for example, that a subject field would be considered to have close to the expected X-coordinate if its X-coordinate was 250, but would be considered to be far from having the expected X-coordinate if its X-coordinate was 400. FIG. 9 depicts these points on a simple number line 400. The first operator-specified point 410 has a value of 250. The second operator-specified point 412 has a value of 400. The apparatus generates point 413 having a value of 0. The apparatus generates point 414 having a value of 550. The value for generated point 414 is arrived at based on the values of the two operator-specified points 410 and 412. Generated point 414 has the same distance from operator-specified point 412 as operator-specified point 412 has from the immediately previous point 410.

As a second example (not depicted), the operator may specify a single point having the value 500. A point having the value 0 is generated. A second point having a value 1000 is then generated.

These points may be denoted as $point_1$ through $point_n$ where n is the total number of points, including the operator-specified points and the invention-generated points. In the example depicted in FIG. 9, n has a value of 4 to indicate the total number of 4 points. Invention-generated point 413 is $point_1$. Operator-specified point 410 is $point_2$. Operator-specified point 412 is $point_3$. Invention-generated point 414 is $point_4$.

Empirical tests indicate that the optimum number of user specified points is two. This results in a total of four points being used: the two operator-specified points 410 and 412, and the two generated points 413 and 414. This provides the required level of granularity to assess degrees of match with a sufficiently high degree of accuracy to be practical.

A class is then defined for each of the points. For example, in a four-point configuration, four classes are defined. Each class corresponds to a particular point. In the example, the following four classes will exist:

$class_1$ (exact match) corresponding to $point_1$ 413.
$class_2$ (close match) corresponding to $point_2$ 410.
$class_3$ (distant match) corresponding to $point_3$ 412.
$class_4$ (no match) corresponding to $point_4$ 414.

A score that determines the degree of correlation between a given reference field and a given subject field may be assessed by assigning each characteristic of the subject field to one or more of these classes. The strength of the class assignment will determine the closeness of a match between the subject field and the reference field for that characteristic.

The assessment of membership in each class is facilitated by a Degree of Membership ("DOM") function. There is a DOM function corresponding to each class. Each DOM function yields a maximum result (e.g., 1000) in response to the point associated with that class. Each DOM function yields a minimum result (generally 0) in response to the points associated with a neighboring point.

FIG. 10 illustrates a set of DOM functions. The functions depicted results from the points depicted in FIG. 9.

Figure 10A:
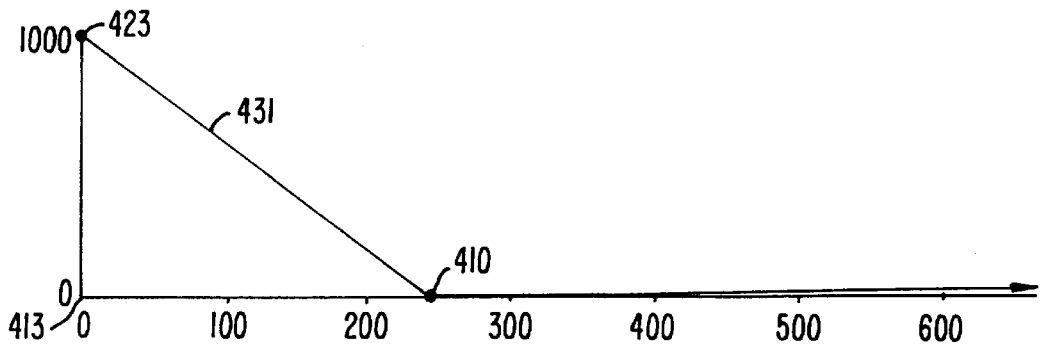
FIGS. 10A to 10D depict a set of degree of membership functions plotted separately.

FIG. 10A depicts $DOM function_1$ 431. The function yields a maximum result (e.g., 1000) in response to $point_1$ 413. The $DOM function_1$ 431 yields a minimum result (e.g., 0) for neighboring $point_1$ 410.

Figure 10B:
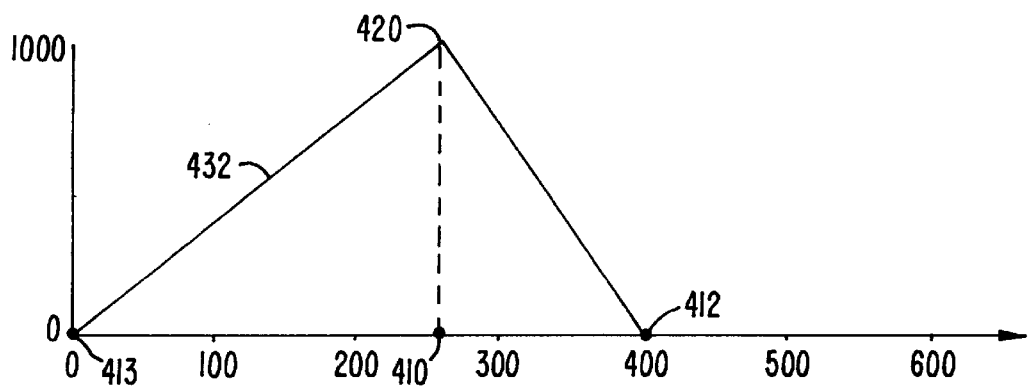

FIG. 10B depicts $DOM function_2$ 432. The function yields a maximum result 420 (e.g., 1000) in response to $point_2$ 410. The function yields a minimum result (e.g., 0) for neighboring points $point_1$ 413 and $point_2$ 412.

Figure 10C:
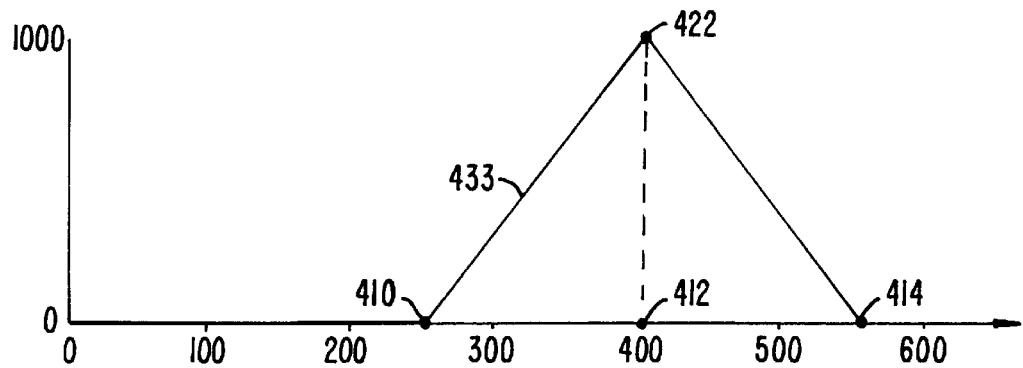

FIG. 10C depicts $DOM function_3$ 433. The function yields a maximum result 422 (e.g., 1000) in response to $point_3$ 412. The function 433 yields a minimum result (e.g., 0) for neighboring points $point_2$ 410 and $point_3$ 414.

Figure 10D:
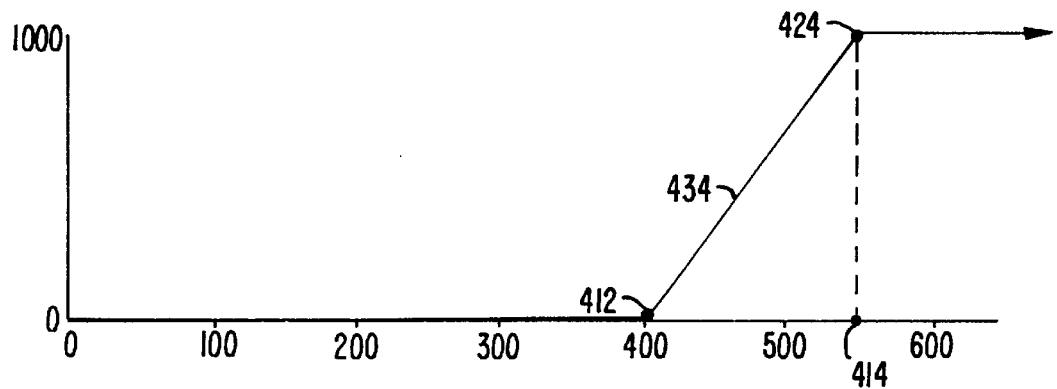

FIG. 10D depicts $DOM function_4$ 434. The function yields a maximum result 424 (e.g., 1000) in response to points having a value greater than or equal to $point_4$ 414. The function 434 yields a minimum result (e.g., 0) for neighboring $point_3$ 412.

Figure 11:
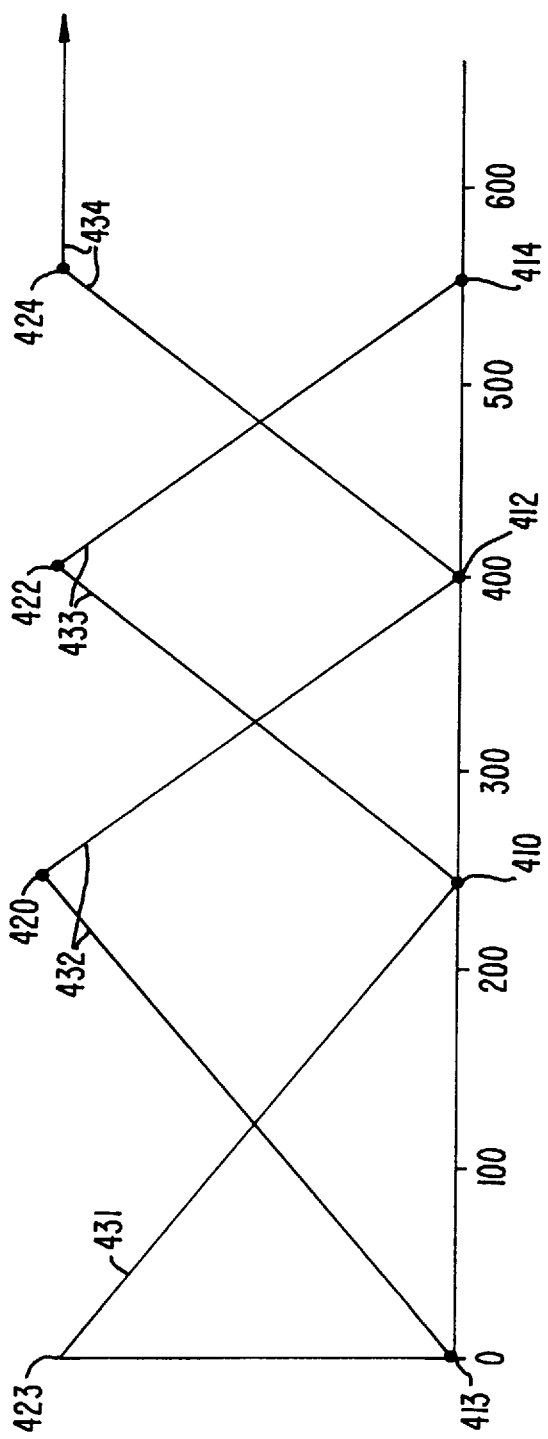
FIG. 11 depicts the set of degree of membership functions of FIGS. 10A to 10D plotted together.

FIG. 11 depicts all of the DOM functions 431, 432, 433, and 434, plotted on a single graph.

The functions as illustrated are straight-lined, uniform, generally symmetrical, and monomodal, i.e., having a single peak. Empirical tests indicate that this configuration is optimal, in that it provides practical results without the requirement for numerically intense computing. However, it is recognized that there are some situations in which a deviation from this implementation may be desirable.

For instance, it may be desirable to have functions that are not straight-lined. One example would be a function smoothed to a bell curve rather than a triangle. A bell curve function would be useful to indicate that deviations in the neighborhood of the match points are of less importance than deviations midway between two match points.

In some instances it may be desirable to use a non-uniform function. For example, a logarithmic function may be used to indicate that the amount of deviation is progressively more important at greater deviations.

It may also be useful to use an asymmetrical function. This would be useful, for example, to indicate that a characteristic scoring too little is more likely to be a match than the same characteristic scoring the same amount too high. An example of this might be a field for a lengthy account number. An asymmetrical function may be used in cases where it is more likely to have a digit dropped than to have an extraneous digit added to the field.

In addition, a function may be bimodal, that is, having two peaks. An example of a bimodal function may be one corresponding to a field that represents the number of characters in a ZIP code. A ZIP code is capable of having either five or nine characters in it. Both 5 and 9 would be appropriate peaks for such a function. Similarly, a multimodal function may be desirable in some instances, for example, for a characteristic measuring the number of digits in a telephone number. Such a characteristic may have three peaks: for 10 digits (the full telephone number including area code), 7 digits (a 7-digit telephone number with no area code), or 4 digits (a 4-digit extension).

Once the DOM functions are defined for each characteristic for each reference field, it is possible to process other document images against these class definitions to determine the degrees of match between fields on the subject documents, and fields on the reference documents.

Referring again to FIG. 8, step 305 calculates a score for the selected characteristic using the DOM functions. In step 305, a characteristic correlation value is determined for the selected characteristic being processed for the selected subject field. The characteristic correlation value is a number that represents a correlation between the characteristic of the subject field being processed and the corresponding characteristic of the reference field being processed. The measured characteristic correlation value is determined by, for each of the match classes, determining a degree of membership in the class and "defuzzing" the degrees of membership into a measured characteristic correlation value.

One method of accomplishing this defuzzing is the Singleton method. Using the Singleton method, a coefficient is defined and associated with each match class. The coefficients are ordered so that the coefficient with the highest value is associated with an exact match and thereafter arrayed in descending order until the coefficient with the low value is associated with the degree of membership function for no match. The coefficients may be denoted as $C_1$ through $C_n$. For example, a coefficient $C_1$ with a value of 100 may be associated with an exact match; a coefficient $C_2$ with a value of 60 associated with a close match; a coefficient $C_3$ with a value of 20 associated with distant match; and a coefficient $C_4$ with a value of −20 associated with no match. Note that the coefficients may be either positive of negative.

The characteristic correlation value is determined by first, for each class, applying the subject field characteristic value to the corresponding degree of membership function to determine a degree of membership that this characteristic has with this class. Each degree of membership is then multiplied by its associated coefficient to obtain a scaled degree of membership. The scaled degrees of membership are summed. The summed scaled degrees of membership are divided by the sum of the unscaled degrees of membership, yielding a characteristic correlation value.

The characteristic correlation value CCV may be expressed as the following equation, where there are "n" points specified, and where each "DOM" represents a degree-of-membership value and each "C" represents the degree-of-membership values's associated coefficient.

$$CCV = \frac{(DOM_1 \times C_1) + (DOM_2 \times C_2) + \ldots + (DOM_n \times C_n)}{DOM_1 + DOM_2 + \ldots + DOM_n}$$

For a four-point embodiment (i.e., the embodiment in which two points are specified by the operator, and two points are generated), the characteristic correlation value CCV may be expressed as the following equation, where each "DOM" represents a degree-of-membership value and each "C" represents the degree-of-membership values's associated coefficient.

$$CCV = \frac{(DOM_1 \times C_1) + (DOM_2 \times C_2) + (DOM_3 \times C_3) + (DOM_4 \times C_4)}{DOM_1 + DOM_2 + DOM_3 + DOM_4}$$

This process may be illustrated using the membership degree functions depicted in FIG. 11 and using the coefficient values of $C_1$=100, $C_2$=60, C3=20, and $C_4$=−20.

Assume that the characteristic whose correlation value is being determined is measured as having a value of 220. The characteristic correlation value may be determined as follows:

$$CCV = \frac{\begin{array}{c}(DOM_1(220) \times C_1) + (DOM_2(220) \times C_2) + \\ (DOM_3(220) \times C_3) + (DOM_4(220) \times C_4)\end{array}}{DOM_1(220) + DOM_2(220) + DOM_3(220) + DOM_4(220)}$$

Figure 12:
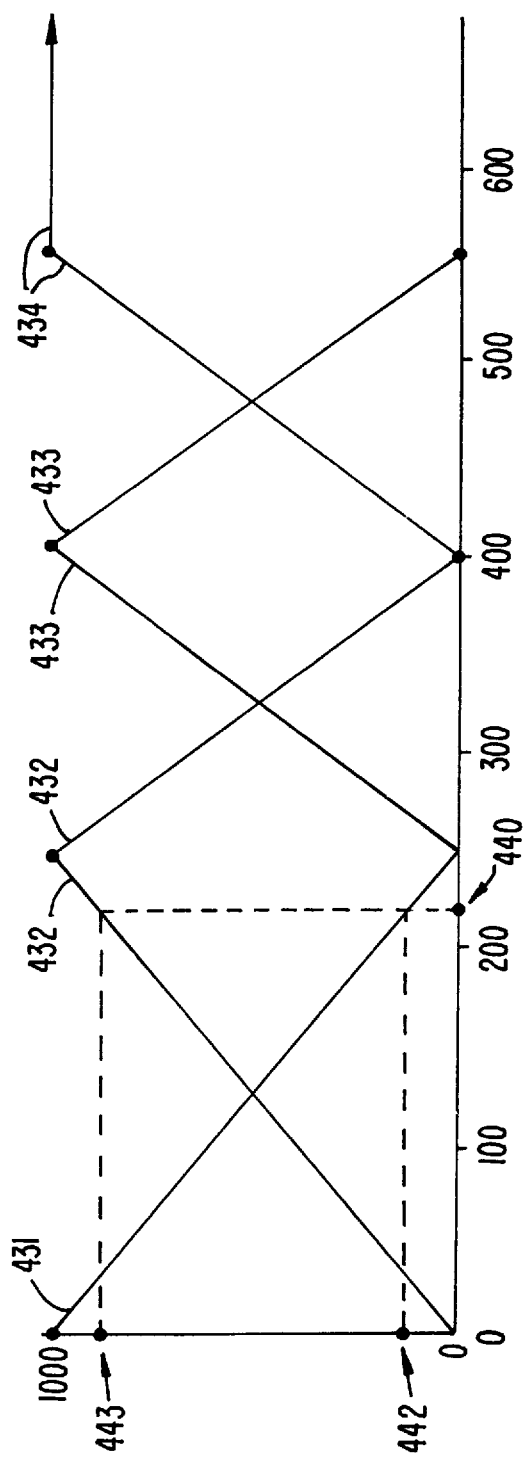
FIG. 12 depicts a sample application of the degree of membership functions of FIGS. 10A to 10D.

FIG. 12 illustrates assessing the values of the various functions. Point 440 represents the measured value of 220. As the plot indicates, DOM function$_1$ 431 yields in response to input 440 an output value represented by point 442, which evaluates to the value 120. DOM function$_2$ 432 yields in response to input 440, an output value represented by point 443, having a value 880. Membership degree functions 433 and 434 each yield a result of 0. This results in the following evaluation:

$$CCV = \frac{(120 \times 100) + (880 \times 60) + (0 \times 20) + (0 \times -20)}{120 + 880 + 0 + 0} = \frac{64800}{1000} = 64.80$$

Thus, the measured characteristic correlation value for a measured characteristic value of 220 is 64.80.

It will be noted that where the degree of membership of a function class is zero, the scaled degree of membership for that class will also be zero, and can therefore need not be computed.

The characteristic correlation value is stored in the "score" data area in the "ref" array entry corresponding to the characteristic being processed. Referring again to FIG. 8, after the characteristic correlation value is determined for this characteristic, it is added in step 306 to the a composite correlation value stored in the "score" data area in the subject document field. Optionally, the score is scaled to provide a confidence level, which is stored in the "conf" data area in the subject document field. The confidence level is a scaled value typically scaled between 0 and 100, where 100 is equal to the highest possible score. This value may later be interrogated to determine the quality of the correlation.

Step 307 checks to see if all characteristics for the subject field being processed have been processed. If not, step 303 selects the next characteristic to be processed and repeats steps 304, 305, 306, and 307 for that characteristic. If all characteristics have been processed, the apparatus proceeds to step 308.

In step 308, the apparatus checks to see if the subject field that has just been processed has a higher score than any subject field previously processed. If so, the just-processed subject field is designated in step 309 as the best match to the reference field found so far. If not, the apparatus proceeds to step 310.

Step 310 checks whether any subject fields remain to be processed. If so, the apparatus returns to step 302 to select the next subject field to be processed. If not, step 311 identifies the highest-scoring subject field as corresponding to the reference field being processed.

Step 312 checks whether any reference fields remain to be processed. If so, the apparatus returns to step 301 to select the next reference field to be processed. If not, major step 300 concludes.

Optionally, if one or more reference document fields is correlated to a subject document field having a confidence level below a predetermined threshold, the apparatus may alert the operator that the correlation of one or more of the fields is questionable.

Major Step 400: Output of Identified Data From Selected Subject Fields

Once the fields on the subject document have been associated with the reference fields, a document image may then optionally be prepared for further processing such as OCR. Preparation for OCR can be performed in at least two ways: by preparation of an OCR mask that corresponds to the desired fields on the subject document, or by copying the desired fields from the subject document to predetermined positions on a new image.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method of locating a specific subject image field in a subject image partitioned into a plurality of subject image fields, the method comprising the computer implemented steps of:

a) determining at least one characteristic value for each of the subject image fields, wherein the characteristic value is determined by one or more characteristics selected from the group consisting of the X-coordinate of the leftmost point of the subject image field, the Y-coordinate of the uppermost pixel of the subject image field, the width of the field, the height of the subject image field, the number of pixels in the subject image field, the number of characters in the subject image field, the number of horizontal lines above the subject image field, the number of horizontal lines below the subject image field, the number of vertical lines to the left of the subject image field, the number of vertical lines to the right of the subject image field, the distance from another field having a particular string of characters, the height, width and number of pixels for each character in the subject image field, and the ASCII value of each character in the subject image field;

b) determining a correlation value for each of the characteristic values by comparing each characteristic value to at least one predetermined criterion;

c) combining the correlation values to yield a composite correlation value for each of the subject image fields; and d) locating the specific subject image field by determining the subject image field with the highest composite correlation value.

2. The method of claim 1 wherein the step of determining the composite correlation value includes applying a weighting factor to at least one of the correlation values.

3. The method of claim 1 further comprising the step of providing the specific subject image field to an optical character recognition system.

4. An apparatus for locating a specific subject image field in a subject image partitioned into a plurality of subject image fields, the apparatus comprising:

a) means for determining at least one characteristic value for each of the subject image fields, wherein the characteristic value is determined by one or more characteristics selected from the group consisting of the X-coordinate of the leftmost point of the subject image field, the Y-coordinate of the uppermost pixel of the subject image field, the width of the field, the height of the subject image field, the number of pixels in the subject image field, the number of characters in the subject image field, the number of horizontal lines above the subject image field, the number of horizontal lines below the subject image field, the number of vertical lines to the left of the subject image field, the number of vertical lines to the right of the subject image field, the distance from another field having a particular string of characters, the height, width and number of pixels for each character in the subject image field, and the ASCII value of each character in the subject image field;

b) means for determining a correlation value for each of the characteristic values by comparing each characteristic value to at least one predetermined criterion;

c) means for combining the correlation values to yield a composite correlation value for each of the subject image fields; and d) means for determining the subject image field with the highest composite correlation value.

5. The apparatus of claim 4, the apparatus further comprising means for applying a weighting factor to at least one of the correlation values.

6. The apparatus of claim 4, the apparatus further comprising means for providing the specific subject image field to an optical character recognition system.

7. A computer-readable medium having stored thereon a plurality of sequences of instructions including instructions which, when executed by a processor, cause said processor to perform the steps of:

a) partitioning the subject image into a plurality of subject image fields;

b) determining at least one characteristic value for each of the subject image fields, wherein the characteristic value is determined by one or more characteristics selected from the group consisting of the X-coordinate of the leftmost point of the subject image field, the Y-coordinate of the uppermost pixel of the subject image field, the width of the field, the height of the subject image field, the number of pixels in the subject image field, the number of characters in the subject image field, the number of horizontal lines above the subject image field, the number of horizontal lines below the subject image field, the number of vertical lines to the left of the subject image field, the number of vertical lines to the right of the subject image field, the distance from another field having a particular string of characters, the height, width and number of pixels for each character in the subject image field, and the ASCII value of each character in the subject image field;

c) determining a correlation value for each of the characteristic values by comparing each characteristic value to at least one predetermined criterion;

d) combining the correlation values to yield a composite correlation value for each of the subject image fields; and e) selecting the subject image field with the highest composite correlation value.

8. The method of claim 1 wherein the predetermined criterion is further comprised of degree of membership functions.

9. The apparatus of claim 4 wherein the predetermined criterion includes one or more degree of membership functions.

10. An apparatus for locating a specific subject image field in a subject image, the apparats comprising:

a) an image processing device configured to partition the subject image into a plurality of subject image fields;

b) a processor;

c) a first software control configured to direct the processor to determine at least one characteristic value for each subject image field, wherein the characteristic value is determined by one or more characteristics selected from the group consisting of the X-coordinate of the leftmost point of the subject image field, the Y-coordinate of the uppermost pixel of the subject image field, the width of the field the height of the subject image field, the number of pixels in the subject image field, the number of characters in the subject image field, the number of horizontal lines above the subject image field, the number of horizontal lines below the subject image field, the number of vertical lines to the left of the subject image field, the number of vertical lines to the right of the subject image field, the distance from another field having a particular string of characters, the height, width and number of pixels for each character in the subject image field, and the ASCII value of each character in the subject image field;

d) a second software control configured to direct the processor to determine correlation values for each of the characteristic values by comparing each characteristic value to at least one predetermined criterion;

e) a third software control configured to direct the processor to combine the correlation values to yield a composite correlation value for each of the subject image fields; and f) a fourth software control configured to direct the processor to determine the subject image field having the highest composite correlation value.

11. The apparatus of claim 10 wherein the predetermined criterion is further comprised of degree of membership functions.

12. An apparatus for locating a specific subject image field on a printed subject document, the apparatus comprising:

a) an image processing device configured to convert the printed subject document into a subject image;

b) a partitioning module configured to partition the subject image into a plurality of subject image fields;

c) a characteristic value module configured to determine at least one characteristic value for each subject image field, wherein the characteristic value is determined by one or more characteristics selected from the group consisting of the X-coordinate of the leftmost point of the subject image field, the Y-coordinate of the uppermost pixel of the subject image field, the width of the field, the height of the subject image field, the number of pixels in the subject image field, the number of characters in the subject image field, the number of horizontal lines above the subject image field, the number of horizontal lines below the subject image field, the number of vertical lines to the left of the subject image field, the number of vertical lines to the right of the subject image field, the distance from another field having a particular string of characters, the height, width and number of pixels for each character in the subject image field, and the ASCII value of each character in the subject image field;

d) a correlation value module configured to determine a correlation value for each of the characteristic values by comparing each characteristic value to at least one predetermined criterion;

e) a combination module configured to combine the correlation values for each of the subject image fields; and f) a selecting module configured to select the subject image field with the highest composite correlation value.

13. The apparatus of claim 12 wherein the predetermined criterion is further comprised of degree of membership functions.

* * * * *